United States Patent
Chia et al.

(10) Patent No.: US 7,429,963 B2
(45) Date of Patent: Sep. 30, 2008

(54) IMAGE PROCESSING DEVICE AND METHOD

(75) Inventors: Pingo Chia, Taipei (TW); Yi-Chieh Huang, Taipei (TW); Bryan Wang, Taipei (TW)

(73) Assignee: Via Technologies, Inc., Taipei (TW)

( * ) Notice: Subject to any disclaimer, the term of this patent is extended or adjusted under 35 U.S.C. 154(b) by 486 days.

(21) Appl. No.: 11/137,729

(22) Filed: May 25, 2005

(65) Prior Publication Data

US 2005/0264553 A1 Dec. 1, 2005

(30) Foreign Application Priority Data

May 28, 2004 (TW) ................. 93115350 A

(51) Int. Cl.
G09G 5/00 (2006.01)
G09G 3/36 (2006.01)
G06F 3/038 (2006.01)

(52) U.S. Cl. .................... 345/3.1; 345/213; 345/98; 345/99

(58) Field of Classification Search .......... 345/3.1, 345/213, 98, 99
See application file for complete search history.

(56) References Cited

U.S. PATENT DOCUMENTS

| 4,760,387 | A | * | 7/1988 | Ishii et al. ............ 345/3.1 |
| 5,694,141 | A | * | 12/1997 | Chee ............... 345/3.1 |
| 5,812,502 | A | * | 9/1998 | Hirai et al. ............ 369/47.34 |
| 5,949,437 | A | * | 9/1999 | Clark ............ 345/502 |
| 6,046,735 | A | * | 4/2000 | Bassetti et al. ........... 345/204 |
| 6,320,575 | B1 | * | 11/2001 | Terashima et al. ........ 345/213 |
| 2004/0222941 | A1 | * | 11/2004 | Wong et al. .......... 345/1.1 |

* cited by examiner

Primary Examiner—Xiao M. Wu
Assistant Examiner—Charles Fan
(74) Attorney, Agent, or Firm—Kirton & McConkie; Evan R. Witt

(57) ABSTRACT

An image processing device includes a frame buffer, a first display engine, a clock signal generator, a spread spectrum clock generator, a first-in-first-out (FIFO) buffer and a reset signal generator. The FIFO buffer receives and stores the pixel digital data from the first display engine according to a data writing index controlled by a working clock signal from the clock signal generator and outputs the pixel digital data to the planar display according to a data reading index controlled by a spread spectrum clock signal from the spread spectrum clock generator. The reset signal generator receives and checks the pixel digital data and generates a reset signal to the FIFO buffer to reset the data writing index and the data reading index when one of the pixel digital data to be inputted into the FIFO buffer is consistent with a preset condition.

13 Claims, 4 Drawing Sheets

IMAGE PROCESSING DEVICE AND METHOD

FIELD OF THE INVENTION

The present invention relates to an image processing device and an image processing method, and more particularly to an image processing device and an image processing method for use with a host computer and at least one planar display.

BACKGROUND OF THE INVENTION

A conventional computer system supporting multi-display to show images on different display devices at the same time is schematically shown in FIG. 1. The computer system comprises a frame buffer 10, a first display engine 11, a second display engine 12, a first-in-first-out (FIFO) buffer 14, a first multiplexer 15, a second multiplexer 16, a phase-lock loop (PLL) clock generator 19 and a spread spectrum clock (SSC) generator 20. The frame buffer 10 stores therein image data. By processing image data in parallel with the first display engine 11 and the second display engine 12, different images can be displayed on a cathode ray tube (CRT) monitor 21 and a liquid crystal display (LCD) monitor 22, respectively. Alternatively, with the arrangement of the first multiplexer 15 and the second multiplexer 16, either of the first display engine 11 and the second display engine 12 can be used to simultaneously display the same image on the CRT monitor 21 and the LCD display 22 so as to perform a multi-display function.

The phase-lock loop (PLL) clock generator 19 is used to generate a clock signal referred to control transmission of image data. Since a PLL clock generator conventionally designed for a CRT monitor has a narrow frequency spectrum, it is not suitable to be directly applied to an LCD display that a severe electromagnetic interference (EMI) stipulation is concerned. Otherwise, the LCD display is likely to fail to pass the EMI test. Therefore, the first-in-first-out (FIFO) buffer 14 and spread spectrum clock (SSC) generator 20 are arranged between the PLL clock generator 19 and the LCD 22 for reducing the EMI emission of the LCD display 22. In response to a clock signal LCDCLK generated by the PLL clock generator 19, the data writing index of the FIFO buffer 14 moves. On the other hand, the SSC generator 20 spreads the frequency spectrum of the clock signal LCDCLK to generate a spread spectrum clock signal SSCLK. In response to the spread spectrum clock signal SSCLK, the data reading index of the FIFO buffer 14 moves. In this way, the clock signal LCDCLK having a narrow frequency spectrum can be dispersed.

Since the frequency of the spread spectrum clock signal SSCLK generally varies with time, the frequency difference between the spread spectrum clock signal SSCLK and the clock signal LCDCLK may lead to operational errors in reading/writing the FIFO buffer 14. For example, so-called "overflow" that the address of the data writing index leading the address of the data reading index may happen. This overflow phenomenon will result in abnormal display.

SUMMARY OF THE INVENTION

The present invention provides an image processing device and an image processing method for opportunely resetting the FIFO buffer so as to minimize the overflow phenomenon.

The present invention provides an image processing device, which comprises a frame buffer for storing therein digital image data; a first display engine in communication with the frame buffer for processing the digital image data into pixel digital data; a clock signal generator in communication with the first display engine for generating a working clock signal required for operations of the first display engine; a spread spectrum clock generator in communication with the clock signal generator for generating a spread spectrum clock signal in response to the working clock signal; a first-in-first-out (FIFO) buffer in communication with the first display engine, the clock signal generator and a planar display for receiving and storing the pixel digital data from the first display engine according to a data writing index controlled by the working clock signal and outputting the pixel digital data to the planar display according to a data reading index controlled by the spread spectrum clock signal; and a reset signal generator in communication with the first display engine and the FIFO buffer for receiving and checking the pixel digital data and generating a reset signal to the FIFO buffer to reset the data writing index and the data reading index when one of the pixel digital data to be inputted into the FIFO buffer is consistent with a preset condition.

In an embodiment, the image processing device further comprises a second display engine in communication with the frame buffer, the clock signal generator and another display for processing the digital image data into another pixel digital data to be outputted to the another display in response to another working clock signal generated by the clock signal generator.

In an embodiment, the image processing device further comprises a path selection unit electrically connected to and downstream of the first and second display engines for selecting the pixel digital data from one of the first and second display engines to be inputted into the FIFO buffer. The path selection unit, for example, comprises a first multiplexer electrically connected to the fist and second display engines for selecting the pixel digital data from one of the first and second display engines for the planar display; and a second multiplexer electrically connected to the fist and second display engines for selecting the pixel digital data from the other one of the first and second display engines for the another display.

In an embodiment, the pixel digital data comprises a display control portion including a vertical synchronization bit, a horizontal synchronization bit and a data active bit required for display control; and an image data portion including a plurality of image data bits. When the vertical synchronization bit, the horizontal synchronization bit and the data active bit in the display control portion are "1", "0", "0" or "0", "0", "0", respectively, and all image data bits in the image data portion are "0", it is determined that the preset condition is satisfied.

In an embodiment, the count of addresses of the FIFO buffer is 2N, and the data writing index and the data reading index are reset to be the 1st and the Nth addresses, respectively, in response to the reset signal.

The present invention also provides an image processing method, which comprises steps of: providing digital image data and a first working clock signal; processing the digital image data into first pixel digital data in response to the first working clock signal; spreading the frequency spectrum of the first working clock signal to generate a spread spectrum clock signal; writing the first pixel digital data into a first-in-first-out (FIFO) buffer according to a data writing index controlled by the first working clock signal and reading the first pixel digital data from the FIFO buffer according to a data reading index controlled by the spread spectrum clock signal in a first display mode; and resetting the data writing index and the data reading index when one of the first pixel digital data to be inputted into the FIFO buffer is consistent with a preset condition.

In an embodiment, the method further comprises a step of outputting the first pixel digital data from the FIFO buffer to a first display requiring a frequency spectrum more dispersive than that of the first working clock signal in the first display mode.

In an embodiment, the method further comprises steps of providing a second working clock signal, processing the digital image data into second pixel digital data in response to the second working clock signal, and outputting the second pixel digital data to a second display requiring a frequency spectrum in conformity with that of the second working clock signal in a second display mode.

In another embodiment, the method further comprises a step of bypassing the first pixel digital data to be inputted to the FIFO buffer to a second display requiring a frequency spectrum in conformity with that of the first working clock signal in a second display mode. The first display mode and the second display mode are simultaneously performed in parallel.

When the count of addresses of the FIFO buffer is 2N, it is preferred that the data writing index and the data reading index are reset to be the 1st and the Nth addresses, respectively.

In an embodiment, the preset condition is that the displaying of a frame is completed but the displaying of next frame has not started yet, or the displaying of a scan line is completed but the displaying of next scan line has not started yet. For example, the preset condition is that vertical synchronization bit, horizontal synchronization bit and data active bit included in the first pixel digital data for display control are "1", "0", "0" or "0", "0", "0", respectively, and all image data bits included in the first pixel digital data are "0".

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
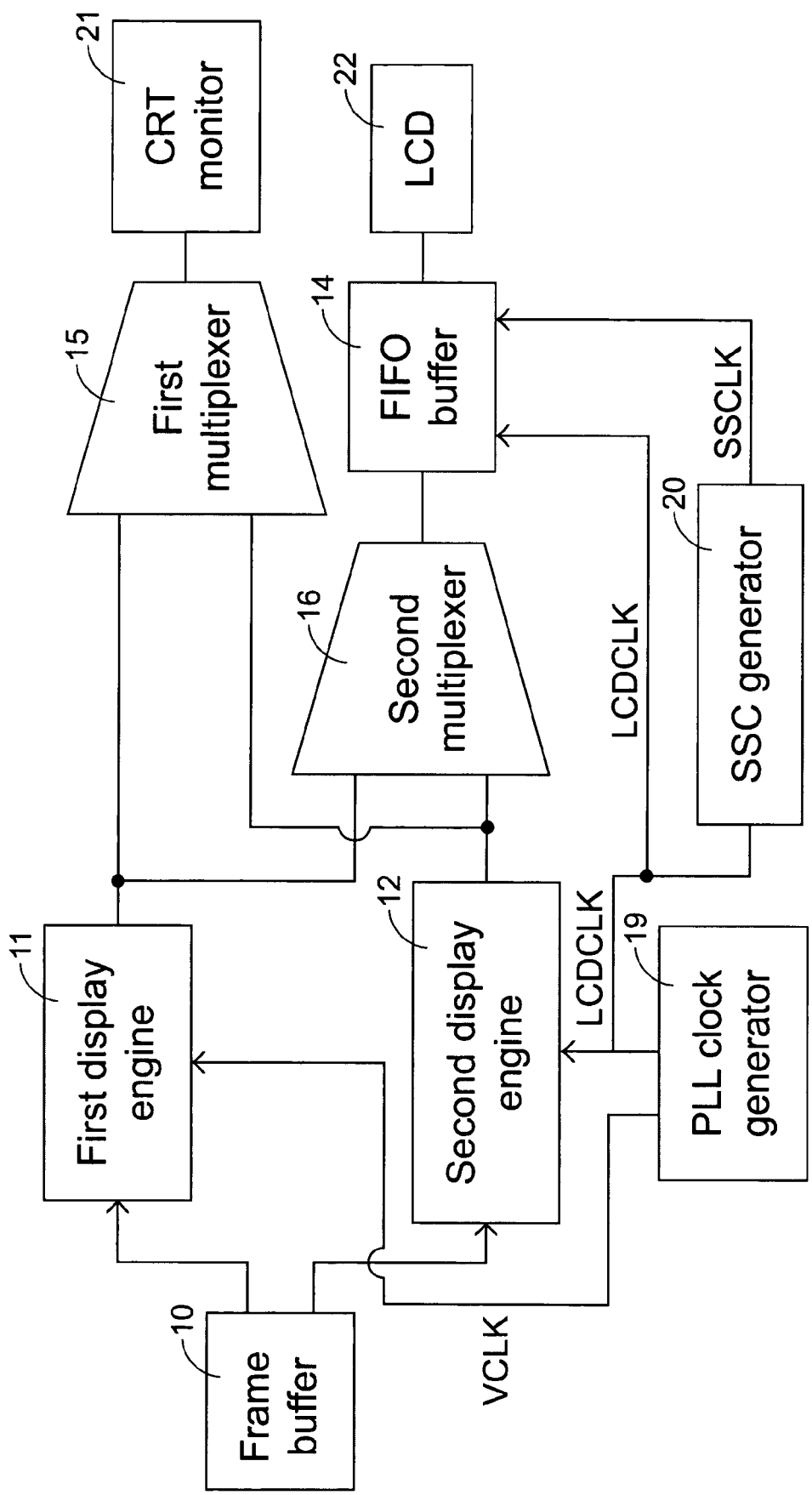
FIG. 1 is a functional block diagram of a conventional computer system supporting multi-display.
Figure 2:
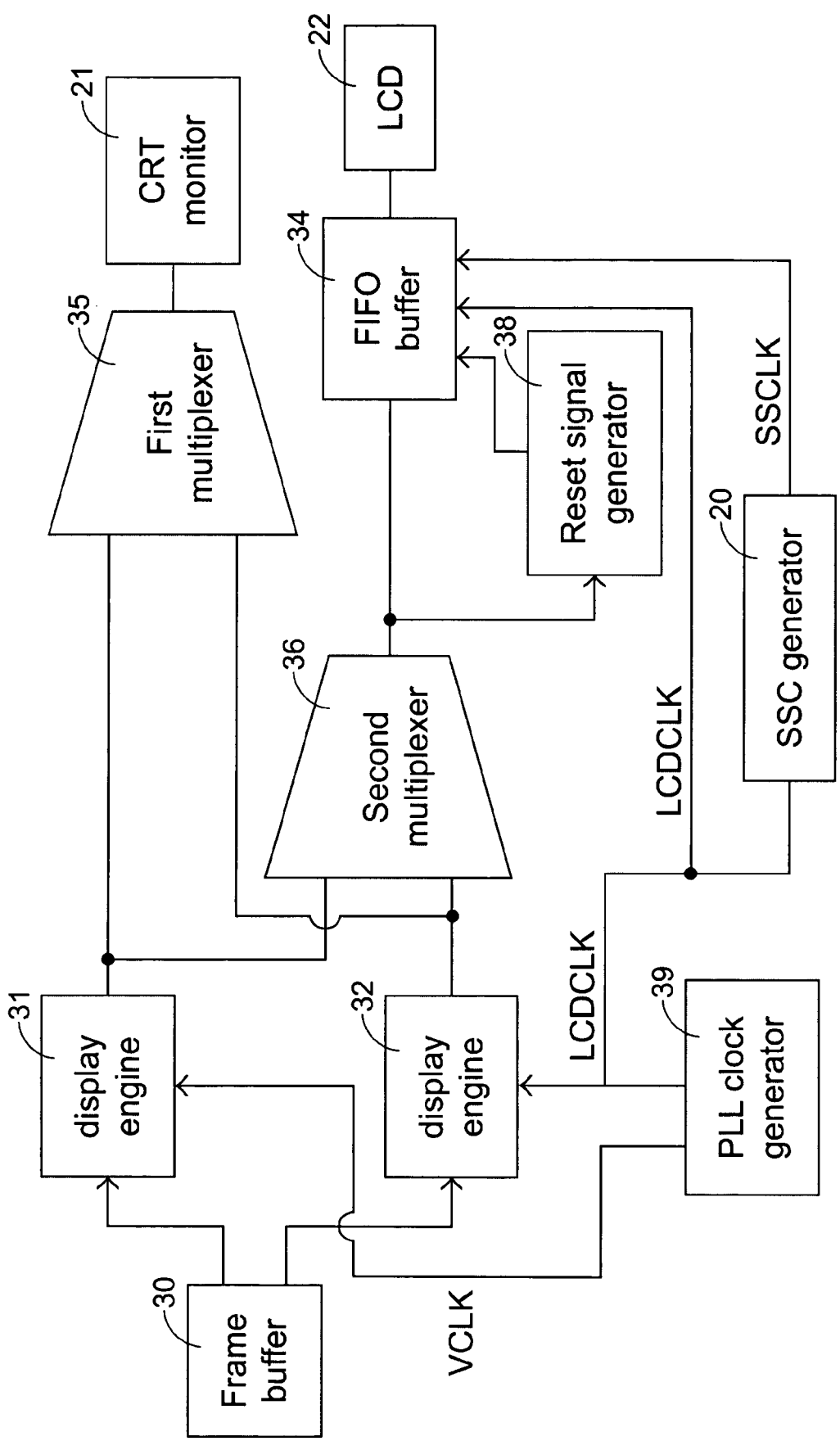
FIG. 2 is a functional block diagram of a computer system supporting multi-display according to a preferred embodiment of the present invention.

Referring to FIG. 2, an embodiment of a computer system according to the present invention comprises a frame buffer 30, display engines 31 and 32, a first-in-first-out (FIFO) buffer 34, multiplexers 35 and 36, a reset signal generator 38, a phase-lock loop (PLL) clock generator 39 and a spread spectrum clock (SSC) generator 40.

The computer system is for supporting multi-display so as to show images on two or more displays at the same time. In order to achieve this purpose, multiple displaying paths are processed in parallel. By processing image data in parallel with the display engines 31 and 32, different images can be displayed on respective displays, for example a cathode ray tube (CRT) monitor 41 and a liquid crystal display (LCD) monitor 42. Alternatively, with the arrangement of the multiplexers 35 and 36, the same image data processed by either of the display engines 31 and 32 can be simultaneously displayed on the CRT monitor 41 and the LCD display 42.

The digital image data stored in the frame buffer 30 are first processed by the display engines 31 and 32 into pixel digital data in response to the working clock signal LCDCLK and VCLK generated by the PLL clock generator 39, respectively. The pixel digital data include a display control portion and an image data portion. For example, the display control portion includes a vertical synchronization bit (V-sync), a horizontal synchronization bit (H-sync) and a data active bit (Data-Active) required for display control. The image data portion includes 24-bit image data consists of R, G and B primary colors of 8 bits each.

Since more dispersive frequency spectrum is required by the LCD display 42 compared to the CRT monitor 41, the spread spectrum clock (SSC) generator 40 is provided for spreading the clock signal LCDCLK to result in a spread spectrum clock signal SSCLK for reducing the EMI emission of the LCD display 42. In response to the clock signal LCDCLK generated by the PLL clock generator 39, the data writing index of the FIFO buffer 34 moves. On the other hand, in response to the spread spectrum clock signal SSCLK, the data reading index of the FIFO buffer 34 moves. Then, the pixel digital data from the display engine 31 are stored in the FIFO buffer 34 according to a data writing index controlled by the clock signal LCDCLK and outputted to the LCD display according to a data reading index controlled by the spread spectrum clock signal. In this way, the frequency spectrum of the clock signal LCDCLK can be dispersed.

Figure 3:
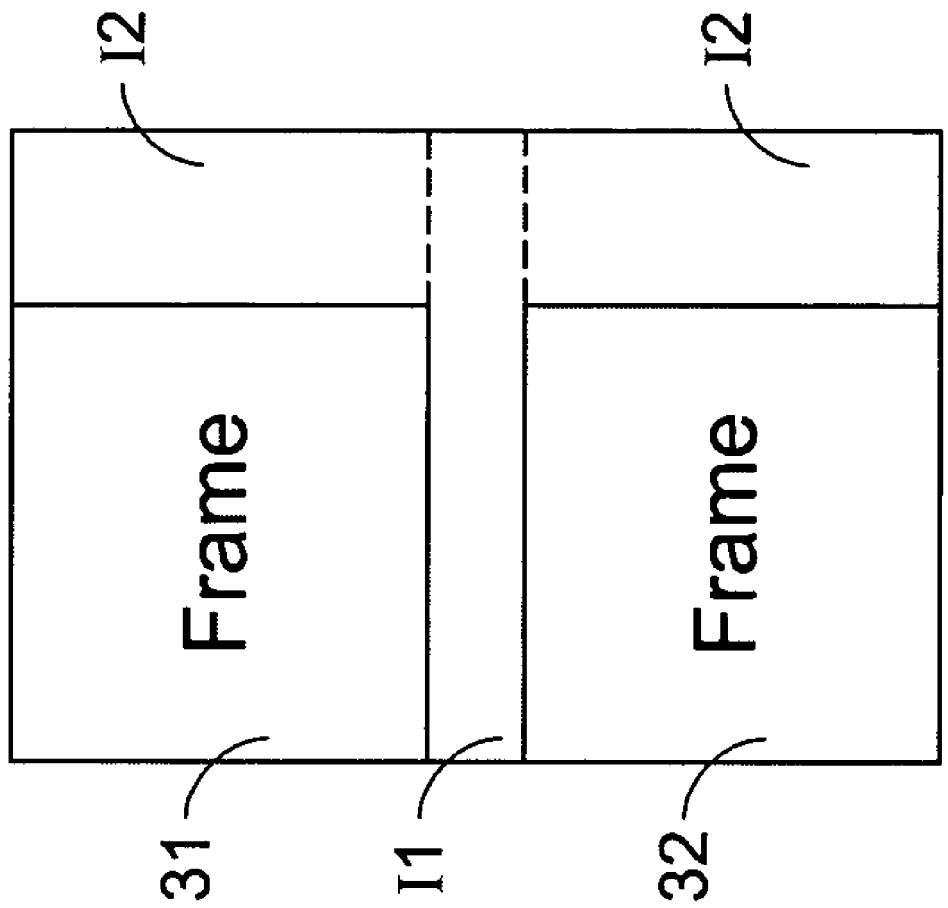
FIG. 3 is a schematic view showing the timing to perform the index resetting operation.

In order to avoid operational errors in reading/writing the FIFO buffer 34 due to the frequency difference between the spread spectrum clock signal SSCLK and the clock signal LCDCLK, e.g. overflow, the FIFO buffer 34 is opportunely reset by the reset signal generator 38 according to the present invention. One of the optimal timing to reset the FIFO buffer 34 would be the break period I2 after completing the displaying of a frame 30 but before starting the displaying of next frame 32, as shown in FIG. 3. Alternatively, the FIFO buffer 34 can also be reset properly during the break period I2 between two scan lines of the same frame. In both cases, the normal display operation will not be affected. The reset signal generator 38 is disposed between the multiplexer 36 and the FIFO buffer 34. The pixel digital data from the display engines 31 and 32 are selected by the multiplexer 36 and inputted to the reset signal generator 38 to be checked. When one of the pixel digital data to be inputted into the FIFO buffer 34 is consistent with a preset condition, a reset signal is generated to reset the data writing index and the data reading index. For example, when the vertical synchronization bit (V-sync), the horizontal synchronization bit (H-sync) and the data active bit (Data-Active) in the display control portion are "1", "0", "0" or "0", "0", "0", respectively, and all image data bits in the image data portion are "0", the preset condition is satisfied. In response to the reset signal, the data writing index and the data reading index are respectively reset to initial addresses such as the first and the Nth addresses of a 2N-address FIFO buffer. For example, if the count of addresses of the FIFO buffer 34 is 32, then the data writing index and the data reading index are reset to be the 1st and the 16th addresses, respectively.

Figure 4:
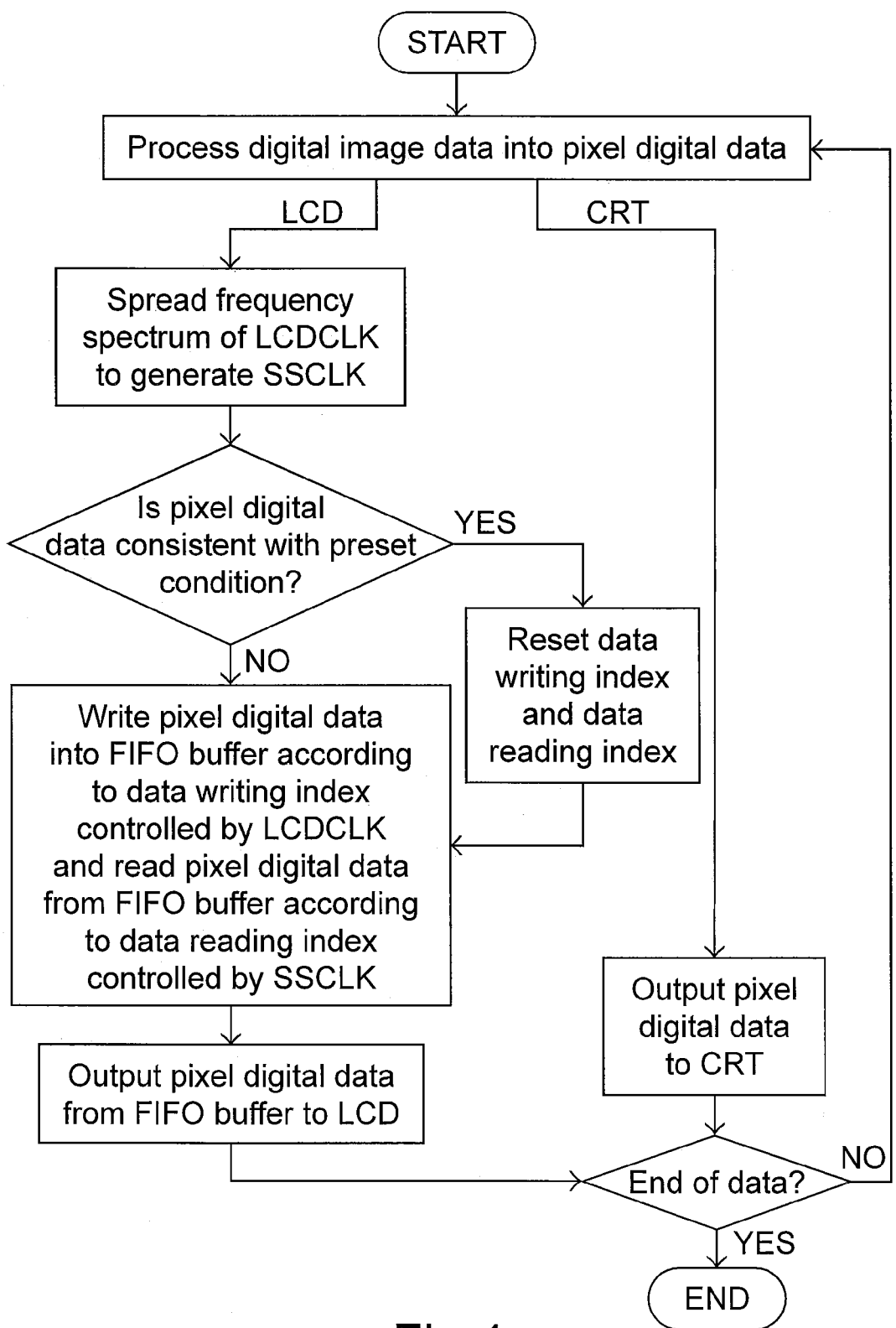
FIG. 4 is a flowchart illustrating an image processing method according to an embodiment of the present invention.

A flowchart as shown in FIG. 4 summarizes an image processing method as mentioned above.

While the above embodiment is illustrated with the example of a liquid crystal display (LCD), a plasma display will also encounter the same EMI problem and suitable to be improved according to the present invention. Further, the display engines 31 and 32, the PLL clock generator 39, the FIFO buffer 34 and the reset signal generator 38 can be integrated in a graphics chip, and the spread spectrum clock generator 40 is disposed outside and independently from the graphics chip or integrated in the graphics chip as well.

From the above description, the image processing device and the image processing method of the present invention are capable of opportunely resetting the FIFO buffer, thereby minimizing the overflow phenomenon.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image processing device comprising:
   a frame buffer for storing therein digital image data;
   a first display engine in communication with said frame buffer for processing said digital image data into pixel digital data comprising an image data portion and a display control portion, said display control portion including a vertical synchronization bit, a horizontal synchronization bit and a data active bit;
   a clock signal generator in communication with said first display engine for generating a working clock signal required for operations of said first display engine;
   a spread spectrum clock generator in communication with said clock signal generator for generating a spread spectrum clock signal in response to said working clock signal;
   a first-in-first-out (FIFO) buffer in communication with said first display engine, said clock signal generator and a planar display for receiving and storing said pixel digital data from said first display engine according to a data writing index controlled by said working clock signal and outputting said pixel digital data to said planar display according to a data reading index controlled by said spread spectrum clock signal; and
   a reset signal generator in communication with said first display engine and said FIFO buffer for receiving and checking said pixel digital data and generating a reset signal to said FIFO buffer to reset said data writing index and said data reading index when one of said pixel digital data to be inputted into said FIFO buffer is consistent with a preset condition;
   wherein said preset condition is satisfied when said vertical synchronization bit, horizontal synchronization bit and data active bit are "1", "0" and "0" or "0", "0" and "0", respectively, and all image data bits included in said image data portion are "0".

2. The image processing device according to claim 1 further comprising a second display engine in communication with said frame buffer, said clock signal generator and another display for processing said digital image data into another pixel digital data to be outputted to said another display in response to another working clock signal generated by said clock signal generator.

3. The image processing device according to claim 2 wherein said planar display is a liquid crystal display (LCD) and said another display is a CRT monitor.

4. The image processing device according to claim 2 wherein said first and second display engines, said clock signal generator, said FIFO buffer and said reset signal generator are integrated in a graphics chip, and said spread spectrum clock generator is disposed independently from said graphics chip.

5. The image processing device according to claim 2 further comprising a path selection unit electrically connected to and downstream of said first and second display engines for selecting said pixel digital data from one of said first and second display engines to be inputted into said FIFO buffer.

6. The image processing device according to claim 5 wherein said path selection unit comprises:
   a first multiplexer electrically connected to said fist and second display engines for selecting said pixel digital data from one of said first and second display engines for said planar display; and
   a second multiplexer electrically connected to said fist and second display engines for selecting said pixel digital data from the other one of said first and second display engines for said another display.

7. The image processing device according to claim 1 wherein the count of addresses of said FIFO buffer is 2N, and said data writing index and said data reading index are reset to be the 1st and the Nth addresses, respectively, in response to said reset signal.

8. The image processing device according to claim 1 wherein said clock signal generator is a phase-locked loop clock signal generator.

9. An image processing method, comprising steps of:
   providing digital image data and a first working clock signal;
   processing said digital image data into first pixel digital data in response to said first working clock signal;
   spreading the frequency spectrum of said first working clock signal to generate a spread spectrum clock signal;
   writing said first pixel digital data into a first-in-first-out (FIFO) buffer according to a data writing index controlled by said first working clock signal and reading said first pixel digital data from said FIFO buffer according to a data reading index controlled by said spread spectrum clock signal in a first display mode; and
   resetting said data writing index and said data reading index when one of said first pixel digital data to be inputted into said FIFO buffer is consistent with a preset condition;
   wherein said preset condition is that vertical synchronization bit, horizontal synchronization bit and data active bit included in said first pixel digital data for display control are "1", "0", "0" or "0", "0", "0", respectively, and all image data bits included in said first pixel digital data are "0".

10. The method according to claim 9 further comprising a step of outputting said first pixel digital data from said FIFO buffer to a first display requiring a frequency spectrum more dispersive than that of said first working clock signal in said first display mode.

11. The method according to claim 10 further comprising steps of providing a second working clock signal, processing said digital image data into second pixel digital data in response to said second working clock signal, and outputting said second pixel digital data to a second display requiring a frequency spectrum in conformity with that of said second working clock signal in a second display mode.

12. The method according to claim 11 wherein said first display mode and said second display mode are simultaneously performed in parallel.

13. The method according to claim 10 wherein the count of addresses of said FIFO buffer is 2N, and said data writing index and said data reading index are reset to be the 1st and the Nth addresses, respectively.

* * * * *